US008017011B2

(12) United States Patent
Ellis et al.

(10) Patent No.: US 8,017,011 B2
(45) Date of Patent: Sep. 13, 2011

(54) PLEATED SINGLE PHASE FILTER COALESCER ELEMENT AND METHOD

(75) Inventors: Jason A. Ellis, LaGrange, GA (US); Ron J. Garrett, LaGrange, GA (US)

(73) Assignee: Kaydon Custom Filtration Corporation, LaGrange, GA (US)

( * ) Notice: Subject to any disclaimer, the term of this patent is extended or adjusted under 35 U.S.C. 154(b) by 287 days.

(21) Appl. No.: 11/513,383

(22) Filed: Aug. 30, 2006

(65) Prior Publication Data

US 2008/0053888 A1 Mar. 6, 2008

(51) Int. Cl.
*B01D 29/07* (2006.01)
*B01D 27/06* (2006.01)
*B01D 29/00* (2006.01)
*B01D 27/00* (2006.01)

(52) U.S. Cl. .................... 210/338; 210/489; 210/493.1; 210/493.5; 210/DIG. 5

(58) Field of Classification Search ........................ None
See application file for complete search history.

(56) References Cited

U.S. PATENT DOCUMENTS 2,911,101 A 11/1959 Robinson
3,115,459 A 12/1963 Giesse
4,124,360 A 11/1978 Berger, Jr. et al.
4,242,206 A 12/1980 Estabrooke
4,253,954 A * 3/1981 Midkiff et al. ................ 210/315
4,485,011 A 11/1984 Cole et al.
4,588,500 A * 5/1986 Sprenger et al. .............. 210/100
4,692,175 A 9/1987 Frantz
4,759,782 A * 7/1988 Miller et al. .................... 55/487
4,878,929 A 11/1989 Tofsland et al.
6,027,653 A * 2/2000 Holland ........................ 210/690
6,422,395 B1 7/2002 Verdegan et al.
6,422,396 B1 7/2002 Li et al.
6,569,330 B1 5/2003 Sprenger et al.
6,932,907 B2 8/2005 Haq et al.
2001/0047967 A1 12/2001 Williamson et al.
2002/0144942 A1 10/2002 Denton et al.
2003/0192433 A1 10/2003 Steiner

* cited by examiner

*Primary Examiner* — In Suk Bullock
*Assistant Examiner* — Madeline Gonzalez
(74) *Attorney, Agent, or Firm* — Price Heneveld LLP

(57) ABSTRACT

A filter coalescer element for oil based industrial fuels includes a rigid, porous support tube, and a hydrophobic drainage layer covering the outer surface of the same. A single phase, dual function combination water coalescer and particle filter pleat block is positioned in the support tube, and is formed from a multilayer material having a first porous support layer, a synthetic microfiber layer, a synthetic fiber media layer and a second porous support layer. As the fluid passes through the pleat block, solid particles are physically filtered therefrom, and water is coalesced into droplets which pass from the pleats directly through the support tube and directly into the drainage layer, where the droplets grow into a size sufficient that they fall under gravity to the bottom of the element for collection.

31 Claims, 3 Drawing Sheets

40
45
55
1
56
57
44
43
42
46
47
49
41
48

75
34
61
6
5
3
2
4
31
32
7
9
30
25
20
15
35
1
45
55
VIII

PLEATED SINGLE PHASE FILTER COALESCER ELEMENT AND METHOD

BACKGROUND OF THE DISCLOSURE

The present invention relates to filtration and coalescer devices, and in particular to a pleated single phase filter coalescer element and method for removing contaminates from lubricants, fuels and other oil based industrial liquids.

Filtering and coalescing devices for oil based industrial fluids, such as petrochemicals in the nature of gasoline, diesel fuel, turbine oil, gear oil, hydraulic fluid, lubricating oil, etc., organic and/or vegetable oils, fuels, etc., as well as synthetic based lubricants and the like, are well known in the art. Contaminants, including particulate, water, and other foreign substances, must be removed from these industrial fluids to ensure proper long term operation and protection of the associated equipment. For example, to achieve long term, predictable and profitable performance from turbines and turbine driven equipment, the lubrication must be both water-free and particulate-free. Oil conditioning systems are used in preventing lubricant oxidation and viscosity breakdown which set the stage for equipment failure due primarily to metal to metal contact between moving parts of the machinery. Preferably, oil conditioning systems quickly and efficiently remove harmful water, particulate and other contaminates from turbine lubrication oils, and other similar industrial fluids.

Prior filtration devices, such as those disclosed in U.S. Pat. Nos. 6,422,396 and 6,569,330, typically have a two phase filter coalescer, which uses a pleated inner pre-filter to first filter particulate from the liquid, and a cylindrical outer sleeve or bun coalescer to remove water from the pre-filtered liquid. While such devices are generally effective, they have a rather complicated construction, provide significant resistance to fuel flow through the system, and do not always remove enough free and emulsified water from the liquid to meet the ever-increasing specifications required by modern industrial equipment.

Hence, a filter coalescer having an uncomplicated construction, with reduced resistance to fluid flow and increased effectiveness in removing both particulate and emulsified water from the liquid would be clearly beneficial.

SUMMARY OF THE INVENTION

One aspect of the present invention is a filter coalescer element for removing contaminates from lubricants, fuels and other oil based industrial liquids, comprising a rigid support tube having an exterior surface, a hollow interior and a porous sidewall through which an industrial liquid flows in an inside out direction. A hydrophobic drainage layer is disposed around and covers at least a portion of the exterior surface of the support tube. A single phase, dual function combination water coalescer and particle filter pleat block is closely received within the interior of the support tube, and has a hollow interior into which the industrial liquid flows in an inside out direction. The pleat block includes a plurality of individual pleats arranged side-by-side and formed from an integrated multilayer material, comprising a first porous support layer having sufficient rigidity to support at least a portion of the pleat block, a synthetic microfiber media layer having a downstream face abuttingly connected with the upstream face of the first support layer, and being configured from non-woven synthetic microfibers, and having a thickness and a surface density sufficient to filter particles from the incoming industrial liquid, and commence water coalescence in the same. The pleat block multilayer material also includes at least one synthetic fiber media layer having a downstream face abutting and connected with the upstream face of the microfiber media layer, and configured from non-woven synthetic fibers, having a thickness and a surface density sufficient to continue water coalescence in the incoming industrial fluid, as well as a second porous support layer having sufficient rigidity to support at least a portion of the pleat block, with a downstream face abutting and connected with the upstream face of the fiber media layer. The drainage layer is positioned immediately adjacent to and abutting the exterior surface of the support tube, whereby as the industrial liquid passes through the pleat block, solid particles are physically filtered therefrom and water is coalesced into droplets which grow in size in the filter media layer, and pass from the individual pleats of the pleat block directly through the porous sidewall of the support tube and directly into the drainage layer where the droplets grow further into drops having a sufficient size that gravity causes the same to fall from the exterior surface of the drainage layer for collection adjacent a bottom portion of the filter coalescer element.

Yet another aspect of the present invention is an apparatus for removing contaminates from lubricants, fuels and other oil based industrial liquids which includes an improved filter coalescer element, having a rigid support tube with an exterior surface, a hollow interior and a porous sidewall through which an industrial liquid flows in an inside out direction. A hydrophobic drainage layer is disposed around and covers at least a portion of the exterior surface of the support tube. A single phase, dual function combination water coalescer and particle filter pleat block is closely received within the interior of the support tube, and has a hollow interior into which the industrial liquid flows in an inside out direction. The pleat block includes a plurality of individual pleats arranged side-by-side and formed from an integrated multilayer material, comprising a first porous layer having sufficient rigidity to support at least a portion of the pleat block, and a synthetic microfiber media layer having a downstream face abutting and connected with the upstream face of the first support layer, and configured from non-woven synthetic microfibers, and having a thickness and a surface density sufficient to filter particles from the incoming industrial liquid, and commence water coalescence in the same. The pleat block multilayer material also includes at least one synthetic fiber media layer having a downstream face abutting and connected with the upstream face of the microfiber media layer, and constructed from non-woven synthetic fibers, having a thickness and a surface density sufficient to continue water coalescence in the incoming industrial liquid, as well as a second porous support layer having sufficient rigidity to support at least a portion of the pleat block, and having a downstream face abutting and connected with the upstream face of the fiber media layer. First and second end caps are attached to and cover at least portions of the opposite ends of the filter coalescer element. The drainage layer is positioned immediately adjacent to and abutting the exterior surface of the support tube, whereby as the industrial liquid passes through the pleat block, solid particles are physically filtered therefrom and water is coalesced into droplets which grow in size in the fiber media layer, and pass from the individual pleats of the pleat block directly through the porous sidewall of the support tube and directly into the drainage layer where the droplets grow further into drops having a sufficient size that gravity causes the same to fall from the exterior surface of the drainage layer for collection in a bottom portion of the apparatus.

Yet another object of the present invention is a filter coalescer element for removing contaminates from lubricants, fuels and other oil based industrial liquids, comprising a rigid support tube having an exterior surface, a hollow interior and a porous sidewall through which an industrial liquid flows in an inside out direction. A hydrophobic drainage layer is positioned around and covers at least a portion of the exterior surface of the support tube. A single phase, dual function combination water coalescer and particle filter pleat block is closely received in the interior of the support tube, and has a hollow interior into which the industrial liquid flows in an inside out direction. The pleat block includes a plurality of individual pleats arranged side-by-side and formed from an integrated, multilayer material, comprising a first porous support layer having sufficient rigidity to support at least a portion of the pleat block, and a synthetic microfiber media layer having a downstream face abutting and connected with the upstream face of the first support layer. The microfiber media layer has a thickness in the range of 0.020-0.035 inches, a basis weight in the range of 0.025-0.032 pounds per square foot, and is configured from non-woven synthetic fibers sized to filter particles from the incoming industrial fluid, and commence water coalescence in the same. The pleat block multilayer material also includes at least one synthetic fiber media layer having a downstream face abutting and connected with the upstream face of the microfiber media layer. The fiber media layer has a thickness in the range of 0.040-0.070 inches, a surface density in the range of 0.15-0.25 ounces per square foot, and is configured from non-woven synthetic fibers having a diameter in the range of 0.03-0.06 mils, so as to continue coalescence in the incoming industrial liquid. The pleat block multilayer material also includes a second porous support layer having sufficient rigidity to support at least a portion of the pleat block, and a downstream face abutting and connected with the upstream face of the fiber media layer, whereby contaminate particles and water in the incoming industrial liquid are contemporaneously removed therefrom as the industrial liquid passes through the pleat block.

Yet another aspect of the present invention is a filter coalescer element for removing contaminates from lubricating oil and the like, comprising a rigid support tube having an exterior surface, a hollow interior and a porous sidewall through which lubricating oil flows in an inside out direction. A cloth drainage layer is disposed around and covers at least a portion of the exterior surface of the support tube. A single phase, dual function combination water coalescer and particle filter pleat block is closely received within the interior of the support tube, and has a hollow interior into which the lubricating oil flows in an inside out direction. The pleat block includes a plurality of individual pleats arranged side-by-side and formed from an integrated, multilayer material, comprising a first wire mesh support layer having a thickness in the range of 0.005-0.011 inches, and sufficient rigidity to support at least a portion of the pleat block, with an upstream face integrated into the pleat block and a downstream face exposed to the incoming lubricating oil. The pleat block multilayer material also includes a microglass media layer having a downstream face abutting and connected with the upstream face of the first wire mesh support layer. The microglass media layer has a thickness in the range of 0.020-0.035 inches, a basis weight in the range of 0.025-0.032 pounds per square foot, a surface area in the range of 20.0-30.0 square feet, and is configured from non-woven glass fibers having a diameter sized to filter particles from the incoming lubricating oil, and commence water coalescence in the same. The pleat block multilayer material also includes a first fiberglass media layer having a downstream face abutting and connected with the upstream face of the microglass media layer. The first fiberglass media layer has a thickness in the range of 0.020-0.035 inches, a surface density in the range of 0.15-0.25 ounces per square foot, and is configured from non-woven glass fibers having a diameter in the range of 0.03-0.06 mils, so as to continue water coalescence in the incoming lubricating oil. The pleat block multilayer material also includes a second fiberglass media layer having a downstream face abutting and connected with the upstream face of the first fiberglass media layer. The second fiberglass media layer has a thickness in the range of 0.020-0.035 inches, a surface density in the range of 0.15-0.25 ounces per square foot, and is configured from non-woven glass fibers having a diameter in the range of 0.03-0.06 mils, so as continue water coalescence in the incoming lubricating oil. The pleat block multilayer material also includes a second wire mesh support layer having a thickness in the range of 0.008-0.012 inches and sufficient rigidity to support at least a portion of the pleat block, with the downstream face abutting and connected with the upstream face of the second fiberglass media layer, whereby contaminate particles and water in the incoming lubricating liquid are contemporaneously removed therefrom as the lubricating oil passes through the pleat block.

Yet another aspect of the present invention is a method for making a filter coalescer element of the type adapted to remove contaminates from lubricants, fuels and other oil based industrial liquids. The method includes forming a rigid support tube with an exterior surface, a hollow interior and a porous sidewall through which an industrial liquid flows in an inside out direction. The method further includes forming a hydrophobic drainage layer into a shape configured to cover at least a portion of the exterior surface of the support tube. The method further includes forming a single phase, dual function combination water coalescer and particle filter pleat block shaped for close reception within the interior of the support tube, including providing a first strip of a porous support material having a predetermined width, and sufficient rigidity to support at least a portion of the pleat block. The pleat block forming step also includes providing a strip of a synthetic microfiber media having a width similar to that of the first porous support layer, configured from non-woven synthetic microfibers, and having a thickness and a surface density sufficient to filter particles from the incoming industrial liquid, and commence water coalescence in the same. The pleat block forming step also includes providing a strip of fiber media having a width similar to the porous support layer and the microfiber media layer, and configured from non-woven synthetic fibers having a thickness and a surface density sufficient to continue water coalescence of the incoming industrial liquid. The pleat block forming step also includes providing a second strip of a porous support material having a width similar to that of the first porous support layer, and sufficient to support at least a portion of the pleat block. The pleat block forming step also includes positioning the downstream face of the microfiber media strip abuttingly over the upstream face of the first strip of porous support material, positioning the downstream face of the fiber media strip abuttingly over the upstream face of the microfiber media strip, and positioning the downstream face of the second strip of porous support material abuttingly over the upstream face of the fiber media strip to define a multilayer filter media. The pleat block forming step also includes pleating the multilayer filter media to integrally connect the first strip of porous support material, the strip of microfiber media, the strip of fiber media and the second strip of porous support material, and form a plurality of individual pleats arranged in a side-by-side relationship. The pleat block forming step also includes cutting the strip of pleated multilayer filter media to a predetermined length, forming the same into a predetermined shape sized for close reception in the interior of the tube, and joining the opposite side edges of the pleated multilayer filter media. The method further includes inserting the joined formed pleated multilayer filter media into the interior of the support tube, and positioning the drainage layer immediately adjacent to and abutting the exterior of the support tube, whereby as the industrial liquid passes through the pleat block, solid particles are physically filtered therefrom and water is coalesced into droplets, which grow in size in the fiber media layer, and pass from the individual pleats of the pleat block directly through the porous sidewall of the support tube and directly into the drainage layer where the droplets grow further into drops having a size sufficient that gravity causes the same to fall from the exterior face of the drainage layer for collection adjacent a bottom portion of the filter coalescer element.

Yet another aspect of the present invention is to provide a filter coalescer having substantially increased coalescing area which provides greater efficiency in removing water from the industrial liquid with reduced flow resistance. The filter coalescer also has improved filtering effectiveness to remove a high percentage of particulate from the industrial liquid. The filter coalescer has a single stage construction which eliminates the need for a separate pre-filter and bun type coalescer, along with a compact shape which permits use of the same in existing filtration equipment, while providing improved filtration performance. The filter coalescer has a lightweight construction and is corrosion resistant to provide a long operating life. The filtering coalescer reduces component wear, increases oil life, reduces maintenance and minimizes machine downtime, thereby providing substantial economic benefits to the user. The filter coalescer has an uncomplicated design, reduced manufacturing costs, and is particularly well adapted for the proposed use.

These and other advantages of the invention will be further understood and appreciated by those skilled in the art by reference to the following written specification, claims and appended drawings.

DETAILED DESCRIPTION OF THE PREFERRED EMBODIMENTS

Figures 1, 2, 3:
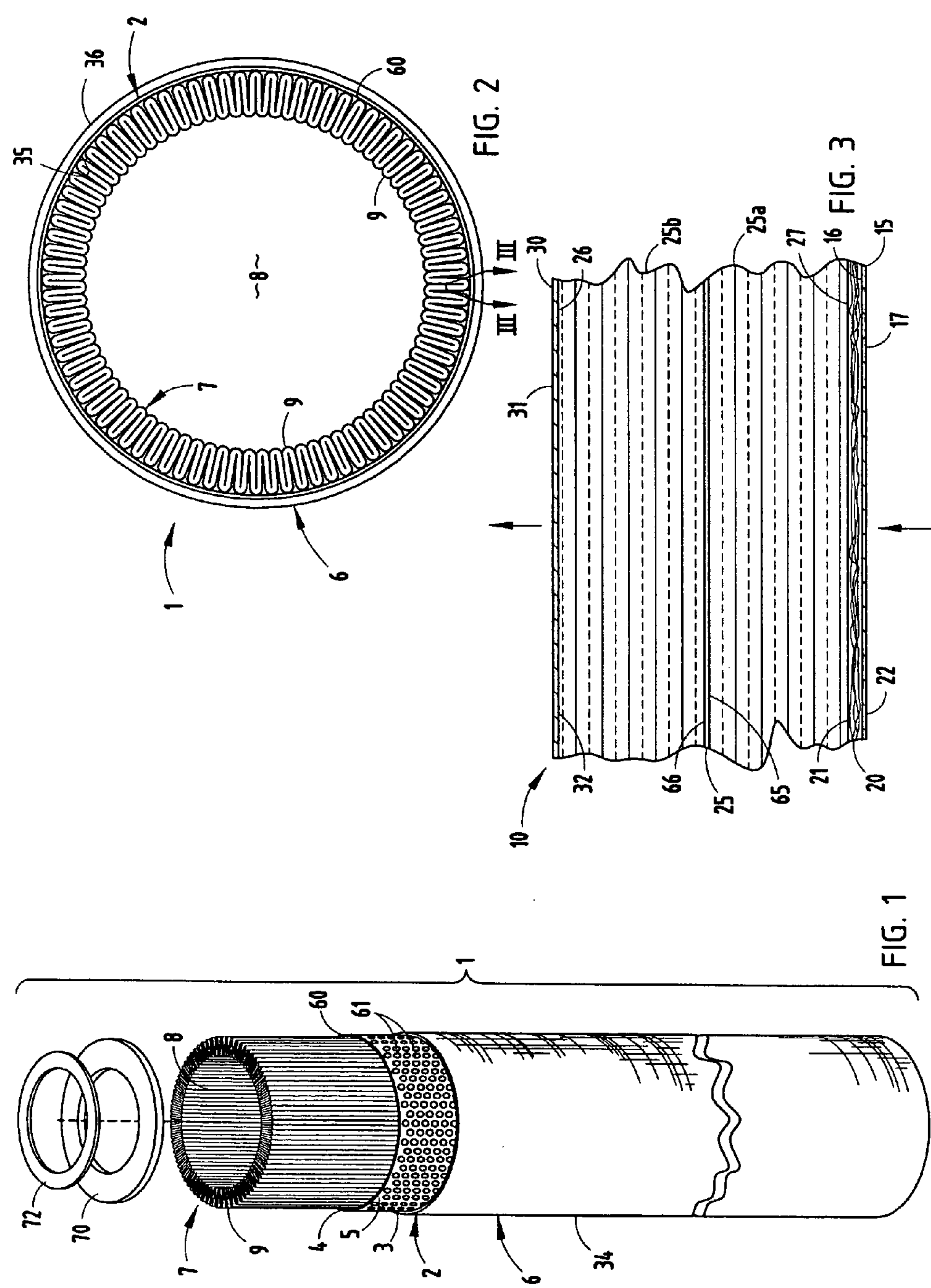
FIG. 1 is an exploded, fragmentary, perspective view of a filter coalescer element embodying the present invention.
FIG. 2 is an end elevational view of pleat block, support tube and drainage layer portions of the filter coalescer element.
FIG. 3 is an enlarged, cross-sectional view of a section of multilayer material from which the pleat block portion of the filter coalescer element is constructed, taken along the line III-III, FIG. 2.

For purposes of description herein, the terms "upper", "lower", "right", "left", "rear", "front", "vertical", "horizontal" and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIG. 1) generally designates a filter coalescer cartridge or element embodying the present invention. Filter coalescer element 1 is generally a liquid/liquid separator, and is specifically designed for use in conjunction with a wide variety of oil based industrial liquids. The term "oil based industrial liquids" as used herein is intended to cover liquids that are not miscible with water, including, but not limited to, petrochemicals in the nature of gasoline, diesel fuel, jet fuel, turbine oil, gear oil, hydraulic fluids, lubricating oil, etc., organic and/or vegetable oils, fuels, etc., as well as synthetic based lubricants and the like. Filter coalescer element 1 includes a rigid support tube 2 having an exterior surface 3, a hollow interior 4 and a porous sidewall 5 through which the industrial liquid flows in an inside out direction. A hydrophobic drainage layer 6 is disposed around and covers at least a portion of the exterior surface 3 of support tube 2. A single phase, dual function combination water coalescer and particle filter pleat block 7 is positioned within the interior 4 of support tube 2, and includes a hollow interior 8 into which the industrial liquid flows in an inside out direction. Pleat block 7 includes a plurality of individual pleats 9 arranged side-by-side, and formed from an integrated, multilayer strip of material 10, an enlarged view of which is shown in FIG. 3 prior to pleating. The industrial liquid flows through the material 10 of pleat block 7 in the direction of the arrows illustrated in FIG. 3. Multilayer material 10 includes a first porous support layer 15 having sufficient rigidity to support at least a portion of pleat block 7, and includes a downstream face 16 integrated into pleat block 7 and an upstream face 17 exposed to the incoming industrial liquid. Multilayer material 10 also includes a synthetic microfiber media layer 20 having a downstream face 21 and an upstream face 22 abutting and connected with the downstream face 16 of first support layer 15. Microfiber media layer 20 is configured from non-woven synthetic microfibers, and has a thickness and a surface density sufficient to filter particles from the incoming industrial liquid, and commence water coalescence in the same. Multilayer material 10 also includes at least one synthetic fiber media layer 25 having a downstream face 26 and an upstream face 27 abutting and connected with the downstream face 21 of microfiber media layer 20. Fiber media layer 25 is configured from non-woven synthetic fibers, and has a thickness and a surface density sufficient to continue water coalescence in the incoming industrial liquid. A second porous support layer 30 has sufficient rigidity to support at least a portion of the pleat block 7, and includes a downstream face 31 oriented toward support tube 2 and an upstream face 32 abutting and connected with the downstream face 26 of fiber media layer 25. Drainage layer 6 is positioned immediately adjacent to and abutting the exterior surface 3 of support tube 2, whereby as the industrial liquid passes through pleat block 7, solid particles are physically filter therefrom and water is coalesced into droplet which grow in size in the fiber media layer 25, and pass from the individual pleats 9 of pleat block 7 directly through the porous sidewall 5 of support tube 2 and directly into drainage layer 6 where the droplets grow further into drops having a size sufficient that gravity causes the same to fall from the exterior surface 34 of drainage layer 6 for collection adjacent a bottom portion of filter coalescer element 1.

Figures 4, 5, 6:
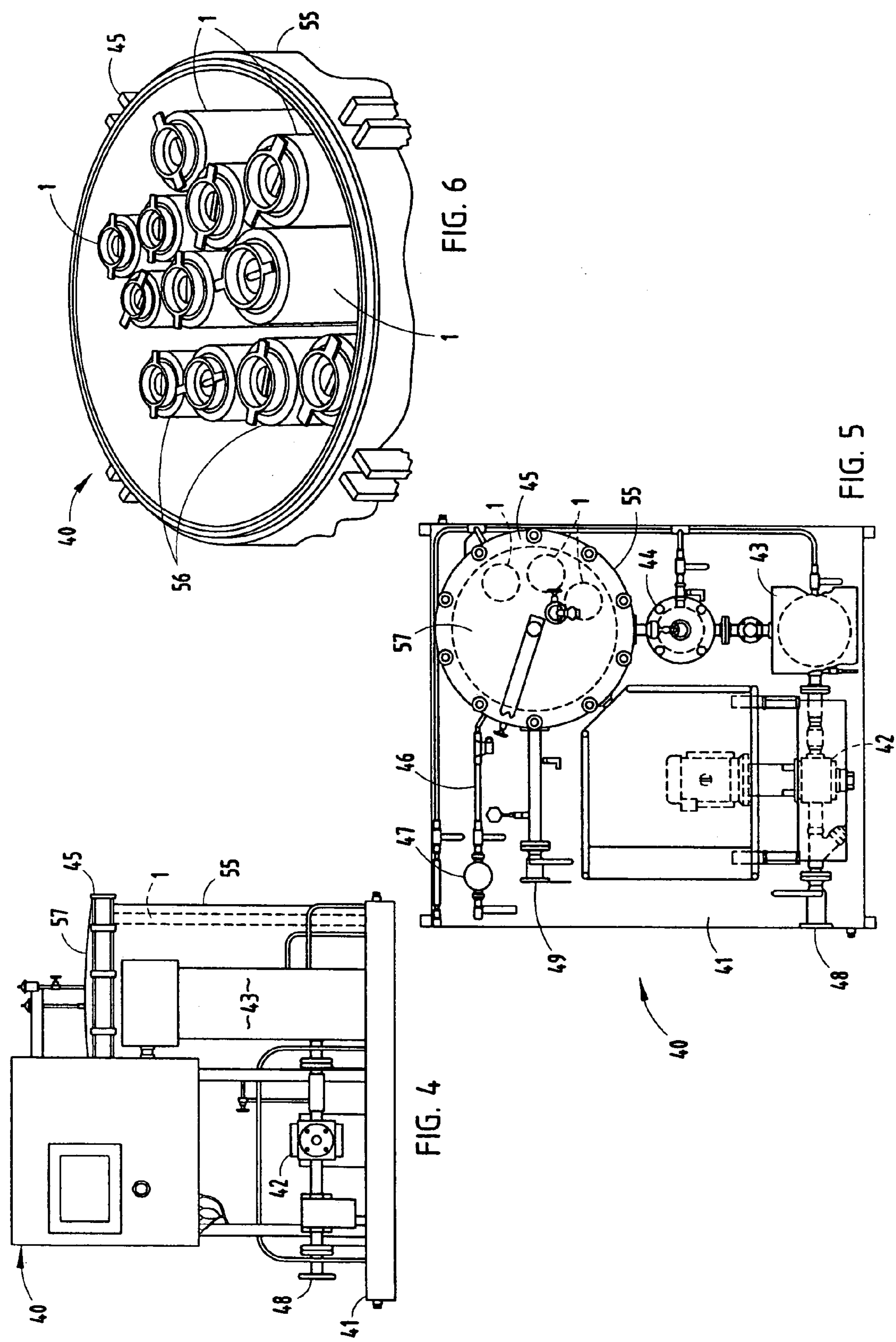
FIG. 4 is a partially diagrammatic, front elevational view of a filtering machine in which the filter coalescer element may be used.
FIG. 5 is a partially schematic top plan view of the filtering machine shown in FIG. 4.
FIG. 6 is a fragmentary perspective view of a vessel portion of the filtering machine, shown with a plurality of filter coalescer elements installed therein.

With reference to FIGS. 4-6, filter coalescer element 1 is adapted to be used in conjunction with a commercially available filtering machine, such as the oil conditioning system 40 illustrated in FIGS. 4-6, which is manufactured and sold by Kaydon Custom Filtration Corporation under the "TURBO-TOC" trademark. The illustrated oil conditioning machine 40 is a self-contained system which is mounted on a sled 41, and includes a pump 42, a heater 43, a pre-filter 44, a coalescer 45, a water drainage tube 46 and a meter 47. In general, the oil or other industrial liquid to be filtered enters through an inlet 48, is pressurized by pump 42, flows through heater 43, pre-filter 44, and coalescer 45, and the conditioned oil or fluid flows through an outlet 49 back to the associated machine or equipment (not shown). As best illustrated in FIG. 6, coalescer 45 includes a circular housing or vessel 55 in which a plurality of filter coalescer elements 1 are arranged in a side-by-side relationship. In the illustrated example, vessel 55 also includes a plurality of separator elements 56. Vessel 55 has a top 57 with ports (not shown) that align with the upper ends of filter coalescer element 1.

With reference to FIG. 1, the illustrated support tube 2 provides an exoskeleton support structure for filter coalescer element 1, and has a generally cylindrical shape, with opposite circular end edges 60. Support tube 2 may be constructed from non-metallic materials, such as plastic, fiberglass, or the like, as well as various metal materials. The illustrated support tube 2 is constructed from a sheet of perforated aluminum with radially extending, circular holes 61, which sheet is formed into a circular shape, and the side edges interconnected to form a rigid porous cylinder that serves to retain pleat block 7 in the annular configuration illustrated in FIGS. 1 and 2. While support tube 2 may be constructed from a wide variety of different materials, the use of aluminum or other similar materials inhibits corrosion, which is particularly advantageous in the coalescer stage of the filtering process, since support tube 2 is exposed to water droplets passing through filter coalescer element 1. Furthermore, the use of such materials reduces the overall weight of filter coalescer element 1.

The illustrated drainage layer 6 is in the form of a sock or cylindrical sleeve which covers the entire exterior surface 3 of support tube 2. Drainage layer 6 is hydrophobic, thereby resisting the flow of water droplets from the interior surface 35 to the exterior surface 34, which causes the water droplets which migrate from pleat block 7 through support tube 2 to grow to a size sufficient that gravity causes the same to fall freely from the exterior surface 34 of drainage layer 6 for collection at the bottom of vessel 55. In one working embodiment of the present invention, drainage layer 6 is made from a knitted or woven fabric material which has been treated with a water repellant to render the same hydrophobic.

The multilayer sheet of material 10 illustrated in FIG. 3 includes a total of five separate layers, which are arranged in a predetermined stacked relationship to achieve both water coalescence and particle filtration in a single pass or phase. The first porous support layer 15 is the upstream-most layer, and is designed to provide rigidity and support to pleat block 7 to alleviate pleat bunching and/or pleat block collapse during cold startups. In one working embodiment of the present invention, porous support layer 15 is constructed from a woven wire mesh having a thickness in the range of 0.005-0.011 inches, and preferably around 0.007 inches. Preferably, porous support layer 15 is made from a material such as aluminum or the like, which resists corrosion, and is relatively lightweight.

The illustrated microfiber media layer 20 is designed to both filter particles from the incoming industrial liquid, as well as to commence water coalescence in the same. The illustrated microfiber media layer 20 is constructed from microglass fibers, and has a thickness in the range of 0.020-0.035 inches, a basis weight in the range of 0.025-0.032 pounds per square foot, and a surface area in the range of 20.0-30.0 square feet.

In one working embodiment of filter coalescer element 1, microfiber media layer 20 is a laminated filter media manufactured by Hollingsworth & Vose under the "HOVOGLAS PLUS" trademark and technical data grade RR-2141-AD. This laminated glass grade is a general purpose lube/hydraulic filtration medium primarily designed for a Beta ration of 75.0 for 3.0 μm. The base material consists of glass microfibers with a three to seven percent acrylic resin binder. The supporting scrims are a high strength spunbonded non-woven polyester. The "A" scrim code is 0.5 ounces per square yard polyester scrim and is laminated to the felt side of the base paper. This side is the upstream side in the filter configuration. The "D" scrim is 1.35 ounces per square yard polyester scrim and is laminated to the downstream or wire side of the medium for structural support. Both scrims are bonded to the glass media using a polyester hot melt which has a melting point of around 325.0 degrees F. The subject laminated filter media has the following properties.

| PROPERTY | | TARGET (RANGE) |
|---|---|---|
| Basis Weight | lbs./3,000.0 $ft^2$ | 85.0 (75.0-95.0) |
| Caliper −0.5 psi | inches | 0.021 (0.15-0.27) |
| Max Pore Deep Well | inches | 16.0 (10.0 min.) |
| Frazier Permeability @ 0.5" $H_2O$ W.G. | $ft^3$/min./$ft^2$ | 12.0 (8.0-16.0) |
| Mullen | psi | 30.0 (15.0 min.) |
| Initial Bubble Point (IN. $H_2O$-AC 396) | | 18.0 (16.0 min.) |
| Third Bubble Point: | | 19.0 (17.0 min.) |
| DOP Smoke Penetration - (%) @ 32.0 Liters/Min.: | | 6.0 (10.0 max.) |
| Resin - % by Weight: | | Beater Added |
| Type: | | Acrylic |
| Tensile Strength, lbs./inches: | | 4.5 (3.0 min.) |
| Dry Mullen Burt, psi (Cured): | | 40.0 (25.0 min.) |

The illustrated fiber media layer 25 comprises two separate sheets 25*a* and 25*b* of fiberglass media. Each of the fiberglass sheets 25*a* and 25*b* has a thickness in the range of 0.020-0.035 inches, a surface density in the range of 0.015-0.25 ounces per square foot, and is configured from non-woven glass fibers having a diameter in the range of 0.03-0.06 mils, so as to continue water coalescence in the incoming lubricating oil. The downstream face 66 of fiberglass sheet 25*a* may be adhered or otherwise connected to the upstream face 65 of fiberglass sheet 25*b* in a manner which does not interfere with the flow of water droplets through media layer 25.

In one working example of filter coalescer element 1, fiber media layer 25 is a fiberglass blanket made by Johns Manville Corporation under the product designation LF_4_B2_¼", and includes the following properties.

| | |
|---|---|
| Thickness (inches): | 0.27 min. |
| Width (inches): | 48.0" +0.125 / −0.125 |
| Length (feet): | 600.0 ft. min. |
| Surface Density (gr/sf): | 6.0 |
| Fiber Diameter | 0.75-1.5 microns |
| Color: | yellow |

The illustrated second porous support layer 30 is similar to the first porous support layer 15, and serves to physically rigidify pleat block 7 to alleviate pleat bunching and prevent collapse of pleat block 7 during cold startups and high flow conditions. In the illustrated example, support layer 30 is constructed from wire mesh having a thickness in the range of 0.008-0.012 inches, and may be constructed from a corrosion resistant material such as aluminum or the like.

Figures 7, 8:
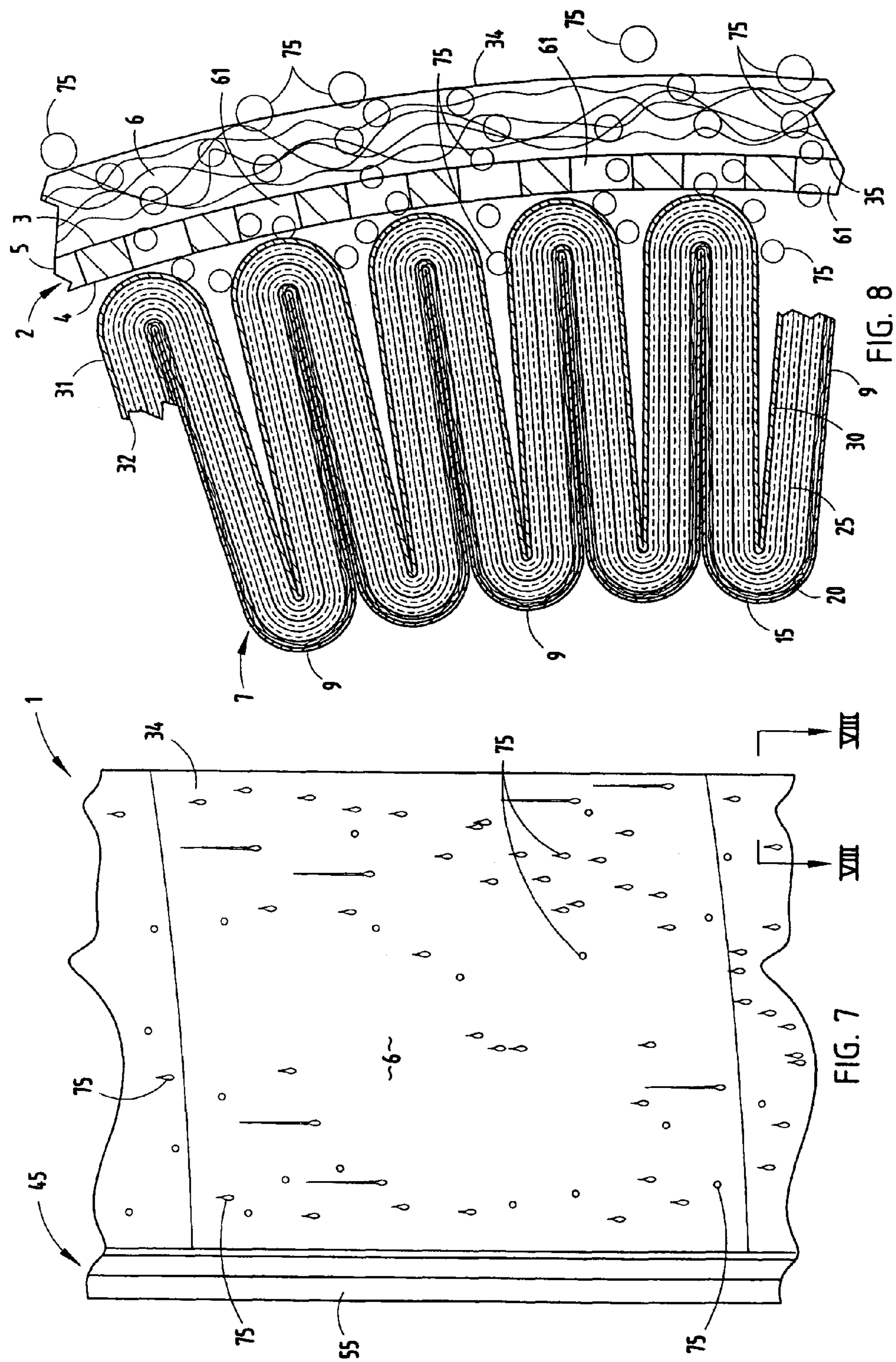
FIG. 7 is a partially schematic, side elevational illustration of the filter coalescer element in use, with water drops falling under gravity from the exterior surface thereof.
FIG. 8 is a partially schematic, horizontal cross-sectional illustration of the filter coalescer element in use, taken along the line VIII-VIII, FIG. 7, with water droplets migrating radially therethrough to an outer surface where they grow to a size sufficient to fall under gravity to a collection area.

In one working embodiment of the present invention, filter coalescer element 1 is manufactured in accordance with the following process. Pleat block 7 is formed by providing separate rolls of each of the layers 15, 20, 25*a*, 25*b* and 30, which rolls are positioned upstream of a conventional pleating machine. Each of the rolls is in the form of a rolled up strip having a substantially common width so that the side edges of the layers 15, 20, 25*a*, 25*b* and 30 are aligned during assembly. The individual layers 15, 20, 25*a*, 25*b* and 30 are payed off of the rolls to form strips which are positioned on top of one another and fed directly into the pleating machine, which forms a plurality of individual pleats 9 arranged in a side-by-side relationship, as shown in FIGS. 1, 2 and 8. In the noted working embodiment of filter coalescer element 1, layers 15, 20, 25*a*, 25*b* and 30 are pleated together without heat or adhesive, so as to insure controlled flow of the industrial liquid therethrough. The layers 15, 20, 25*a*, 25*b* and 30 are physically held together by the pleating process, and the wire mesh support layers 15 and 30 are inelastically deformed into the corrugated or pleated configuration shown in FIG. 2, which captures the filter layers 20, 25*a* and 25*b* therebetween, and provides structural rigidity to pleat block 7. The formed strip of pleated multilayer filter media is then cut lengthwise to the desired size and shape of filter coalescer element 1. In the illustrated example, the pleated multilayer filter media is cut lengthwise so that the resultant outside diameter of pleat block 7 is closely received within the interior of support tube 2.

After the pleated multilayer filter media is cut lengthwise and formed to the desired shape, the opposite side edges of the filter media are seamed or joined to form the pleat block, which is in turn inserted into the interior of support tube 2. If necessary, the strip of pleated material may be trimmed to size and shape prior to forming the same into a cylinder. In the illustrated pleat block 7, the individual pleats 9 extend in a generally radial direction. Also, as best shown in FIG. 2, pleat block 7 has a sinusoidal end elevational configuration, with a pleat density of around 3.0-4.0 pleats per inch along the outside diameter of pleat block 7.

In the illustrated example, annularly-shaped end caps 70 are attached to the upper and lower ends of pleat block 7 by means such as adhesive or the like. End caps 70 may be made from metal or plastic, such as a pottable epoxy or urethane or the like. Annularly-shaped gaskets 72 are also provided to form seals at the opposite ends of filter coalescer element 1 with abutting portions of coalescer vessel 55.

It is to be understood that preferably, the diameter of pleat block 7, the number of pleats 9 and height of pleat block 7 are predetermined to fit inside support tube 2 to produce maximum surface area, maximum residence time of the water through the media, and minimum pressure drop across element 1. Other variations of the illustrated element 1 are also contemplated. For example, the "A" and "D" scrims made of polyester could also be made from nylon, polypropylene or other chemically compatible materials depending upon the properties of the specific industrial liquid being conditioned.

During operation, filter coalescer element 1 functions in the manner diagrammatically illustrated in FIGS. 7 and 8. The industrial liquid to be filtered is pressurized by pump 42, heated by heater 43 to a predetermined temperature, flowed through pre-filter 44, and introduced into the interior of filter coalescer element 1. The industrial liquid passes through support layer 15 and into microfiber media layer 20, where particulate is filtered out of the liquid, and any free or emulsified water or moisture in the liquid starts to coalesce as the liquid flows through microfiber media layer 20. More specifically, the free and emulsified water in the industrial liquid attaches itself to the fibers of microfiber media layer 20, which droplets grow in size as they pass therethrough. As the water droplets from microfiber media layer 20 pass into fiber media layers 25*a* and 25*b*, the same are further grown in size, as shown in FIG. 8, thereby removing more moisture from the industrial liquid. As best illustrated in FIG. 8, the water droplets 75 pass directly through the second or outer support layer 30 of pleat block 7, through the openings 61 in support tube 2 and into drainage layer 6. As best shown in FIG. 7, the hydrophobic nature of drainage layer 6 causes the droplets to go further to a size sufficient that gravity causes the same to fall from the exterior surface 34 of drainage layer 6 for collection adjacent the bottom of coalescer vessel 55. More specifically, in the illustrated example, when the water droplets coalesce through element 1 and exit drainage layer 6, they fall to the bottom of the filter vessel and collect where they are purged from the system once the coalesced water level reaches a predetermined amount.

In at least one working embodiment of the present invention, which has a length of around 44.0 inches, an outside diameter of around 6.0 inches and an inside diameter of around 2.65 inches, it is found that filter coalescer element 1 provides an increased coalescing area of 200.0 to 250.0 percent over prior art pre-filter/coalescer bun configurations. Furthermore, the subject filter coalescer element has increased water removal efficiency to 98.5 percent, a 30.0 percent reduction in element weight, an effluent water below 100.0 parts per million, and an increased particle efficiency (Beta 1000.0 at 5.0 micron).

The pleat block 7 of filter coalescer element 1 captures both the free water and the dispersed phase water droplets in the industrial liquid, and allows the droplets maximum growth, while creating a passage through pleat block 7 for the release of the water droplets downstream. This design eliminates the need for a separate coalescing bed or bun and a pre-filter.

It is to be understood that filter coalescer element 1 can be made in a wide variety of different sizes, as well as shapes, such as oval, quadrilateral, circular, and the like. Also, filter coalescer element 1 can be adapted for different flow patterns, including outside in flow, etc., to accommodate the needs of various filtering machines and/or equipment.

Filter coalescer element 1 has a rugged, uncomplicated construction which is less expensive to manufacture, and has improved efficiency and effectiveness in removing both particulate and water from oil based industrial liquids. Filter coalescer 1 integrates the particle filter and water coalescence features into a single phase element, thereby eliminating the need for separate pre-filter and bun coalescer constructions. Consequently, filter coalescer element 1 has a lighter weight, improved effectiveness, and a compact profile which permits the same to be used in conjunction with existing filtration equipment.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A filter coalescer element for removing dispersed liquid water and solid particle contaminants from liquid lubricants, liquid fuels and other oil based industrial liquids, comprising:

a rigid support tube having an exterior surface, a hollow interior and a porous sidewall through which an industrial liquid flows in an inside out direction;

a hydrophobic drainage layer disposed around and covering at least a portion of the exterior surface of said support tube;

a single phase, dual function combination water coalescer and particle filter pleat block inserted closely within and abutting against the interior of said support tube, and having a hollow interior into which the industrial liquid flows in an inside out direction, and including a plurality of individual pleats arranged side-by-side and formed from an integrated, multilayer material, comprising:

a first porous support layer having sufficient rigidity to support at least a portion of said pleat block, with a downstream face integrated into said pleat block and an upstream face exposed to the incoming industrial liquid;

a synthetic microfiber media layer having a downstream face and an upstream face abutting said downstream face of said first support layer; said microfiber media layer being configured from non-woven synthetic microfibers, and having a thickness, and a-surface density with associated predetermined first pore size sufficient to filter solid particles from the incoming industrial liquid, and commence coalescence of dispersed liquid water particles in the same;

at least one synthetic fiber media layer having a downstream face and an upstream face abutting said downstream face of said microfiber media layer; said fiber media layer being configured from non-woven synthetic fibers, and having a thickness and a surface density with associated predetermined second pore size that is greater than said first pore size of said microfiber media layer, and is sufficient to continue coalescence of the dispersed liquid water particles in the incoming industrial liquid; and a second porous support layer having sufficient rigidity to support at least a portion of said pleat block, with a downstream face oriented toward and abutting against said support tube and an upstream face abutting said downstream face of said fiber media layer; and wherein said drainage layer is positioned immediately adjacent to and abutting said exterior surface of said support tube, whereby as the industrial liquid passes through said pleat block, solid particles are physically filtered therefrom and the dispersed liquid water particles are coalesced into droplets which grow in size in said fiber media layer, and pass from said individual pleats of said pleat block directly through said porous sidewall of said support tube and directly into said drainage layer where the droplets grow further into drops having a size sufficient that gravity causes the same to fall from the exterior surface of said drainage layer for collection adjacent a bottom portion of said filter coalescer element.

2. A filter coalescer element as set forth in claim 1, wherein:

said pleat block has a generally cylindrical shape with said individual pleats extending in a generally radial direction.

3. A filter coalescer element as set forth in claim 2, wherein:

said individual pleats are configured to provide a flow surface area in the range of 40.0-60.0 $ft^2$, thereby reducing the flow rate of the industrial fluid therethrough for improved water coalescence.

4. A filter coalescer element as set forth in claim 3, wherein:

said microfiber media layer has a surface area in the range of 20.0-30.0 $ft^2$.

5. A filter coalescer element as set forth in claim 4, wherein:

said fiber media layer has a surface area in the range of 45.0-55.0 $ft^2$.

6. A filter coalescer element as set forth in claim 5, wherein:

said drainage layer comprises a woven fabric sock covering at least a major portion of the exterior surface of said support tube.

7. A filter coalescer element as set forth in claim 6, wherein:

said first porous support layer comprises a woven wire mesh.

8. A filter coalescer element as set forth in claim 7, wherein:

said microfiber media layer comprises a microglass media layer having a thickness in the range of 0.020-0.035 inches, and a basis weight in the range of 0.025-0.032 pounds per square foot.

9. A filter coalescer element as set forth in claim 8, wherein:

said fiber media layer has a thickness in the range of 0.40-0.70 inches, a surface density in the range of 0.15-0.25 ounces per square foot, and is configured from non-woven glass fibers having a diameter in the range of 0.03-0.06 mils.

10. A filter coalescer element as set forth in claim 9, wherein:

said second porous support layer comprises a woven wire mesh.

11. A filter coalescer element as set forth in claim 10, wherein:

said support tube comprises a perforated metal cylinder.

12. A filter coalescer element as set forth in claim 11, wherein:

said pleat block has a sinusoidal end elevational shape arranged in a circular configuration within said support tube.

13. A filter coalescer element as set forth in claim 12, wherein:

said fiber media layer comprises first and second fiber media layers arranged in an overlying relationship, each having a thickness in the range of 0.20-0.35 inches, a surface density in the range of 0.15-0.25 ounces per square foot, and being configured from non-woven glass fibers having a diameter in the range of 0.03-0.06 mils.

14. A filter coalescer element as set forth in claim 13, wherein:

said pleat block has a pleat density measured at an outside diameter of the pleat block in the range of 3.0-4.0 pleats per inch.

15. A filter coalescer element as set forth in claim 14, wherein:

said first wire mesh support layer has a thickness in the range of 0.005-0.011 inches.

16. A filter coalescer element as set forth in claim 15, wherein:

said second wire mesh support layer has a thickness in the range of 0.008-0.012 inches.

17. A filter coalescer element as set forth in claim 1, wherein:

said support tube comprises a perforated cylinder; and said pleat block has a sinusoidal end elevational shape arranged in a circular configuration within said support tube.

18. In an apparatus for removing dispersed liquid water and solid particle contaminants from liquid lubricants, liquid fuels and other oil based industrial liquids, an improved filter coalescer element, comprising:

a rigid support tube having an exterior surface, a hollow interior and a porous sidewall through which an industrial liquid flows in an inside out direction;

a hydrophobic drainage layer disposed around and covering at least a portion of the exterior surface of said support tube;

a single phase, dual function combination water coalescer and particle filter pleat block inserted closely within and abutting against the interior of said support tube, and having a hollow interior into which the industrial liquid flows in an inside out direction, and including a plurality of individual pleats arranged side-by-side and formed from an integrated, multilayer material, comprising:

a first porous support layer having sufficient rigidity to support at least a portion of said pleat block, with a downstream face integrated into said pleat block and an upstream face exposed to the incoming industrial liquid;

a synthetic microfiber media layer having a downstream face and an upstream face abutting said downstream face of said first support layer; said microfiber media layer being configured from non-woven synthetic microfibers, and having a thickness and a surface density with associated predetermined first pore size sufficient to filter solid particles from the incoming industrial liquid, and commence coalescence of dispersed liquid water particles in the same;

at least one synthetic fiber media layer having a downstream face and an upstream face abutting said downstream face of said microfiber media layer; said fiber media layer being configured from non-woven synthetic fibers, and having a thickness and a surface density with associated predetermined second pore size that is greater than said first pore size of said microfiber media layer, and is sufficient to continue coalescence of the dispersed liquid water particles in the incoming industrial liquid; and a second porous support layer having sufficient rigidity to support at least a portion of said pleat block, with a downstream face oriented toward and abutting against said support tube and an upstream face abutting said downstream face of said fiber media layer;

first and second end caps attached to and covering at least portions of opposite ends of said filter coalescer element; and wherein said drainage layer is positioned immediately adjacent to and abutting said exterior surface of said support tube, whereby as the industrial liquid passes through said pleat block, solid particles are physically filtered therefrom and the dispersed liquid water particles are coalesced into droplets which grow in size in said fiber media layer, and pass from said individual pleats of said pleat block directly through said porous sidewall of said support tube and directly into said drainage layer where the droplets grow further into drops having a size sufficient that gravity causes the same to fall from the exterior surface of said drainage layer for collection at a bottom portion of said apparatus.

19. An apparatus as set forth in claim 18, including:

a coalescer vessel;

a plurality of said filter coalescer elements positioned in said coalescer vessel; and a pre-filter vessel disposed upstream of said coalescer vessel, and communicating therewith.

20. A filter coalescer element for removing dispersed liquid water and solid particle contaminants from liquid lubricants, liquid fuels, and other oil based industrial liquids, comprising:

a rigid support tube having an exterior surface, a hollow interior and a porous sidewall through which an industrial liquid flows in an inside out direction;

a hydrophobic drainage layer disposed around and covering at least a portion of the exterior surface of said support tube; and a single phase, dual function combination water coalescer and particle filter pleat block inserted closely within and abutting against the interior of said support tube, and having a hollow interior into which the industrial liquid flows in an inside out direction, and including a plurality of individual pleats arranged side-by-side and formed from an integrated, multilayer material, comprising:

a first porous support layer having sufficient rigidity to support at least a portion of said pleat block, with a downstream face integrated into said pleat block and an upstream face exposed to the incoming industrial liquid;

a synthetic microfiber media layer having a downstream face and an upstream face abutting said downstream face of said first support layer; said microfiber media layer having a thickness in the range of 0.020-0.035 inches, a basis weight in the range of 0.025-0.032 pounds per square foot, and configured from non-woven synthetic fibers with a surface density and associated predetermined first pore size to filter particles from the incoming industrial liquid, and commence coalescence of dispersed liquid water particles in the same;

at least one synthetic fiber media layer having a downstream face and an upstream face abutting said downstream face of said microfiber media layer; said fiber media layer having a thickness in the range of 0.040-0.070 inches, a surface density in the range of 0.15-0.25 ounces per square foot with associated predetermined second pore size that is greater than said first pore size of said microfiber media layer, and configured from non-woven synthetic fibers having a diameter in the range of 0.03-0.06 mils, so as to continue coalescence of the dispersed liquid water particles in the incoming industrial liquid; and a second porous support layer having sufficient rigidity to support at least a portion of said pleat block, with a downstream face oriented toward and abutting against said support tube and an upstream face abutting said downstream face of said fiber media layer, whereby contaminate solid particles and the dispersed liquid water particles in the incoming industrial liquid are contemporaneously removed therefrom as the industrial liquid passes through said pleat block.

21. A filter coalescer element as set forth in claim 20, wherein:

said pleat block has a generally cylindrical shape with said individual pleats extending in a generally radial direction.

22. A filter coalescer element as set forth in claim 21, wherein:

said individual pleats are configured to provide a flow surface area in the range of 40.0-60.0 $ft^2$, thereby reducing the flow rate of the industrial fluid therethrough for improved water coalescence.

23. A filter coalescer element as set forth in claim 22, wherein:

said microfiber media layer has a surface area in the range of 20.0-30.0 $ft^2$.

24. A filter coalescer element as set forth in claim 23, wherein:

said fiber media layer has a surface area in the range of 45.0-55.0 $ft^2$.

25. A filter coalescer element as set forth in claim 24, wherein:

said drainage layer comprises a woven fabric sock covering at least a major portion of the exterior surface of said support tube.

26. A filter coalescer element as set forth in claim 25, wherein:

said first and second porous support layers each comprise a woven wire mesh.

27. A filter coalescer element as set forth in claim 26, wherein:

said pleat block has a sinusoidal end elevational shape arranged in a circular configuration within said support tube.

28. A filter coalescer element for removing dispersed liquid water and solid particle contaminants from liquid lubricating oil and the like, comprising:

a rigid support tube having an exterior surface, a hollow interior and a perforate sidewall through which lubricating oil flows in an inside out direction;

a cloth drainage layer disposed around and covering at least a portion of the exterior surface of said support tube; and a single phase, dual function combination water coalescer and particle filter pleat block inserted closely within and abutting against the interior of said support tube, and having a hollow interior into which the lubricating oil flows in an inside out direction, and including a plurality of individual pleats arranged side-by-side and formed from an integrated, multilayer material, comprising:

a first wire mesh support layer having a thickness in the range of 0.005-0.011 inches and sufficient rigidity to support at least a portion of said pleat block, with a downstream face integrated into said pleat block and an upstream face exposed to the incoming lubricating oil;

a microglass media layer having a downstream face and an upstream face abutting said downstream face of said first wire mesh support layer; said microglass media layer having a thickness in the range of 0.020-0.035 inches, a basis weight in the range of 0.025-0.032 pounds per square foot, a surface area in the range of 20.0-30.0 square feet, and configured from non-woven glass fibers having a diameter and surface density with associated predetermined first pore size to filter particles from the incoming lubricating oil, and commence water coalescence in the same;

a first fiberglass media layer having a downstream face and an upstream face abutting said downstream face of said microglass media layer; said first fiberglass media layer having a thickness in the range of 0.020-0.035 inches, a surface density in the range of 0.15-0.25 ounces per square foot with associated predetermined second pore size that is greater than said first pore size of said first fiberglass media layer, and configured from non-woven glass fibers having a diameter in the range of 0.03-0.06 mils, so as to continue water coalescence in the incoming lubricating oil;

a second fiberglass media layer having a downstream face and an upstream face abutting said downstream face of said first fiberglass media layer;

said second fiberglass media layer having a thickness in the range of 0.020-0.035 inches, and a surface density in the range of 0.15-0.25 ounces per square foot with associated predetermined third pore size that is greater than said first pore size of said first fiberglass media layer, and configured from non-woven glass fibers having a diameter in the range of 0.03-0.06 mils, so as to continue water coalescence in the incoming lubricating oil; and a second wire mesh support layer having a thickness in the range of 0.008-0.012 inches and sufficient rigidity to support at least a portion of said pleat block, with a downstream face oriented toward and abutting against said support tube and an upstream face abutting said downstream face of said second fiberglass media layer, whereby contaminate solid particles and the dispersed liquid water particles in the incoming lubricating oil are contemporaneously removed therefrom as the lubricating oil passes through said pleat block.

29. A filter coalescer element as set forth in claim 28, wherein:

said pleat block has a sinusoidal end elevational shape arranged in a circular configuration within said support tube.

30. A filter coalescer element as set forth in claim 29, wherein:

said pleat block has a generally cylindrical shape with said individual pleats extending in a generally radial direction.

31. A filter coalescer element as set forth in claim 30 in combination with a pre-filter disposed upstream of said coalescer element and communicating therewith.

* * * * *